Figure 1:
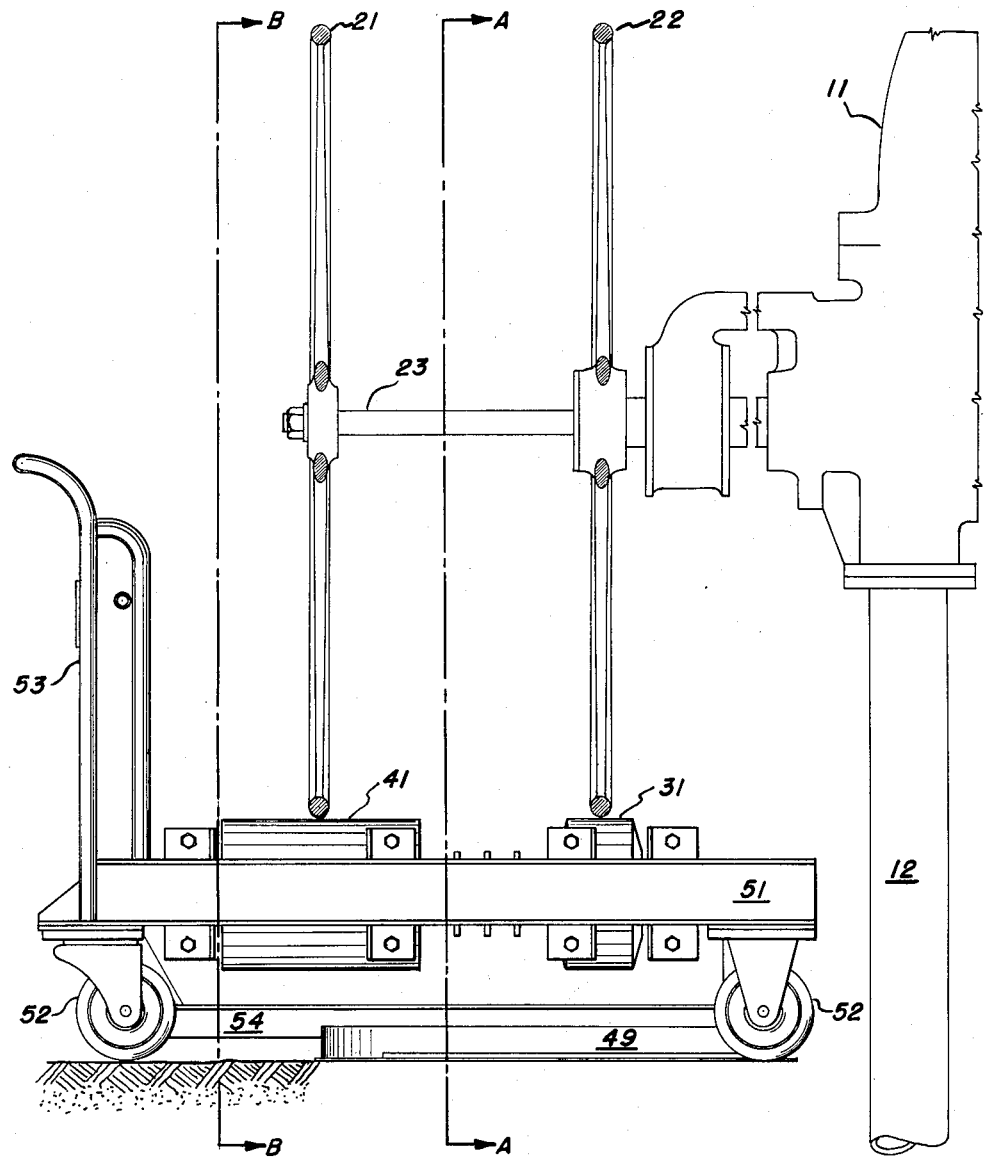

June 19, 1956  H. A. THOMAS  2,750,809
PORTABLE HAND WHEEL ACTUATOR

Filed March 29, 1955  4 Sheets-Sheet 2

INVENTOR.
HENRY A. THOMAS
BY
*Kenneth Swartwood*
INVENTOR

United States Patent Office 2,750,809
Patented June 19, 1956

2,750,809

PORTABLE HAND WHEEL ACTUATOR

Henry A. Thomas, Baton Rouge, La., assignor to Ethyl Corporation, New York, N. Y., a corporation of Delaware Application March 29, 1955, Serial No. 497,490

2 Claims. (Cl. 74—472)

This invention relates to apparatus for powered operation of hand wheels or similar rotative elements forming part of chemical processing equipment or the like. More specifically, the invention relates to apparatus for actuating rotative elements subject to varying torque resistance to operation.

Chemical processing equipment frequently has manually rotatable control elements of various types. For example, valves, agitators or the like frequently are actuated by relatively large rotatable hand wheels. In many instances, the equipment elements so actuated require a sequence of very low resistance rotation and a limited period of high resistance rotation, this sequence being in either the indicated or the reverse order. In other instances more than one apparatus element may require actuation by a corresponding plurality of rotatable hand wheels. Further, in such plural element situations, concurrent correlated rotation may be required to accomplish certain results. The plurality of hand wheels in such an environment may be located upon a common axis or may be on different axes and still the correlated rotation may be necessary. In some instances, one of the control wheels may shift laterally on its axis during operation.

It is evident that a wide variety of apparatus elements may require operation through normally manually operated controllers. In all cases for which the present invention is intended, however, a characteristic is that a period of relatively free running rotation must be accomplished as well as a period, of usually short duration, in which a relatively high torque must be applied.

A typical apparatus or illustration of the environment in which the present invention is particularly useful is in connection with apparatus such as is described and claimed in the Stecher et al. U. S. Patent 2,170,353. The valve and enclosure plate shown by Stecher et al. may be considered typical of mechanisms for the actuation of which the present invention is peculiarly adaptable. For convenience hereafter, said valves are hereafter referred to as double wheeled valves. A characteristic of such devices is that one hand wheel actuates movement of the closure proper, and the other hand wheel actuates independent rotation of the closure element. Such apparatus is particularly useful in providing pressurized closures for vessels processing heterogeneous systems containing finely divided solids. The independent rotation of the closure element (in contrast to its lateral movement to and from the closure port) allows proper and pressure tight sealing of the element even though the seal may be originally fouled with particles which would normally tend to prevent tight closure.

Heretofore in operation of such devices manually, it has been necessary to assign two men in every operation of a unit of appreciable size. This arises because the independently rotating element must be rotated at the same time that the closure element or plug is being moved in to make contact with the seat of the closure port. Particularly at the final portion of the movement toward seating the possible presence of solids requires a substantial torque application, and the combined efforts of several men was customarily necessary. In contrast, in "running in" such a valve to a position approaching final closure, the movement is relatively free of high torque requirements.

Various mechanical actuators have heretofore been proposed for providing the above described functions, but they have not been successful because they did not provide the described feature of maximum torque at or approaching final closure, or on opening, but instead only were successful in applying uniform torque on the rotating element, or if direct movement elements were applied in providing only uniform and direct thrust during the entire portion of travel.

Accordingly, a need has existed for a powered actuator for devices of the character described which would automatically provide relatively rapid movement of the several elements during the "free-running" portion of the opening or closing cycle, but would also provide an automatic and appreciable increase in effective torque during the final closure portion of an operating cycle.

The object of the present invention is to provide apparatus for actuating hand wheels or similar rotatable elements by a friction drive, and for automatically providing an effective correlation of an engaging pressure and an applied torque. More specifically, the principal object of the invention is to provide apparatus of the character described wherein frictional contact is made between a driving roller and the rotatable element being driven, and the engaging pressure and the torque applied by the driving roller are automatically correlated according to the demands of the driven element and substantially no slippage is encountered. An additional object of specific embodiments of the apparatus of the invention is to provide a powered actuator for a plurality of hand wheels requiring correlated movement. A further specific object is to provide a powered actuator for providing correlated actuation of a plurality of hand wheels mounted upon a common axis, but with at least one of said wheels being laterally movable upon said axis. An additional object is to provide an actuator for a plurality of rotatable elements requiring correlated operation wherein a further multiplication of driving torque can be provided when necessary. Still another object is to provide an actuator for rotatable elements, the actuator being susceptible of transportation and application to a bank or battery of apparatus units having such rotatable elements. Other objects will appear hereinafter.

In its most general form, the invention comprises in combination a gas supply line, a pressure-flow regulator fed by the gas line, a gas motor for providing rotation utilizing the gas supplied through said regulator, and discharging to the atmosphere, at least one drive roller for frictional engagement with the driven wheel, means for providing said engagement, said means being actuated by the gas from said regulator, and conduit means for supplying gas to the aforesaid motor and to the engaging means. A characteristic of all forms of the invention is that the gas supply regulator feeds jointly gas to the engaging means and to the gas motor, and that the regulator is sized so that full setting pressure of the gas being fed thereby cannot be maintained under low torque operation of the motor. The conduit means to the air motor and to the engaging means, being supplied gas in common by the gas regulator, are integrated in operation because of the above stated relationship of regulator capacity and the gas motor gas consumption capacity. In other words, when the gas motor is operating under low torque conditions, and hence at relatively high speed, the amount of gas which it consumes and discharges to the atmosphere results in a reduction in gas pressure applied to the engaging means. On the other hand, in portions of an operation cycle wherein a maximum torque application is required, the gas motor is laboring or approaching its stall point, and hence consumes less gas from the regulator and thence vents less to the atmosphere, and hence the pressure maintained in the common supply conduit by the regulator builds up to the regulator delivery pressure setting. This in turn increases the engaging pressure of the actuating roller against the rotatable element to provide non-slipping engagement even for highest torque operation.

Figure 3:
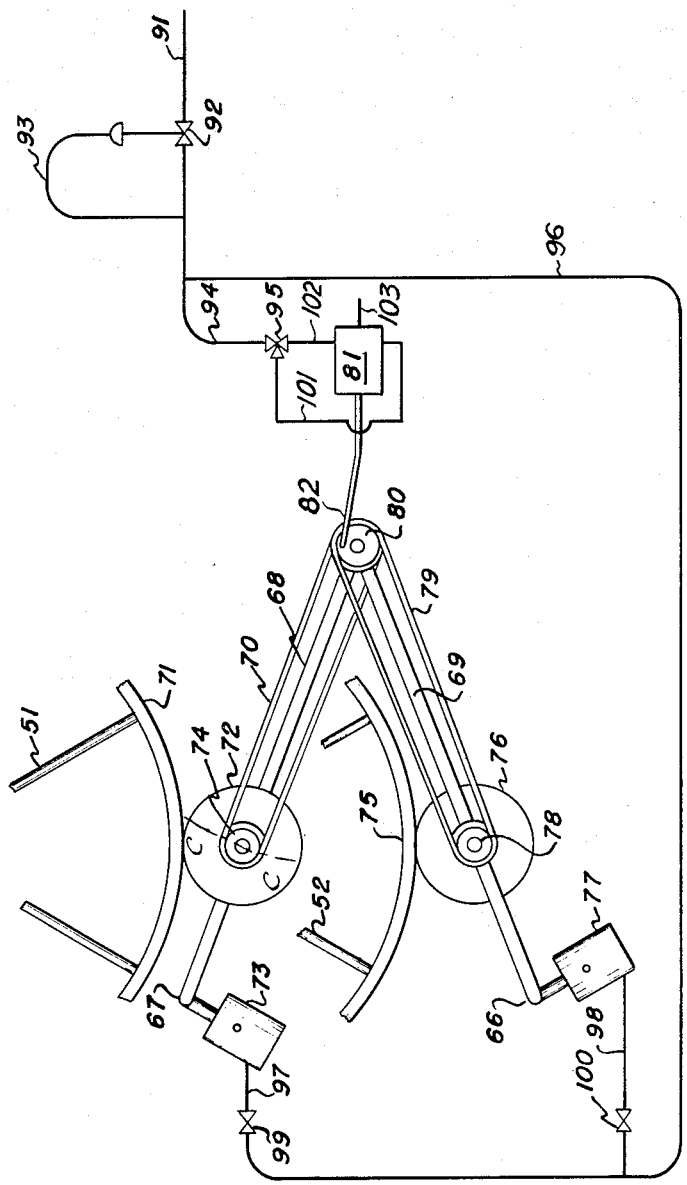
Figure 4:
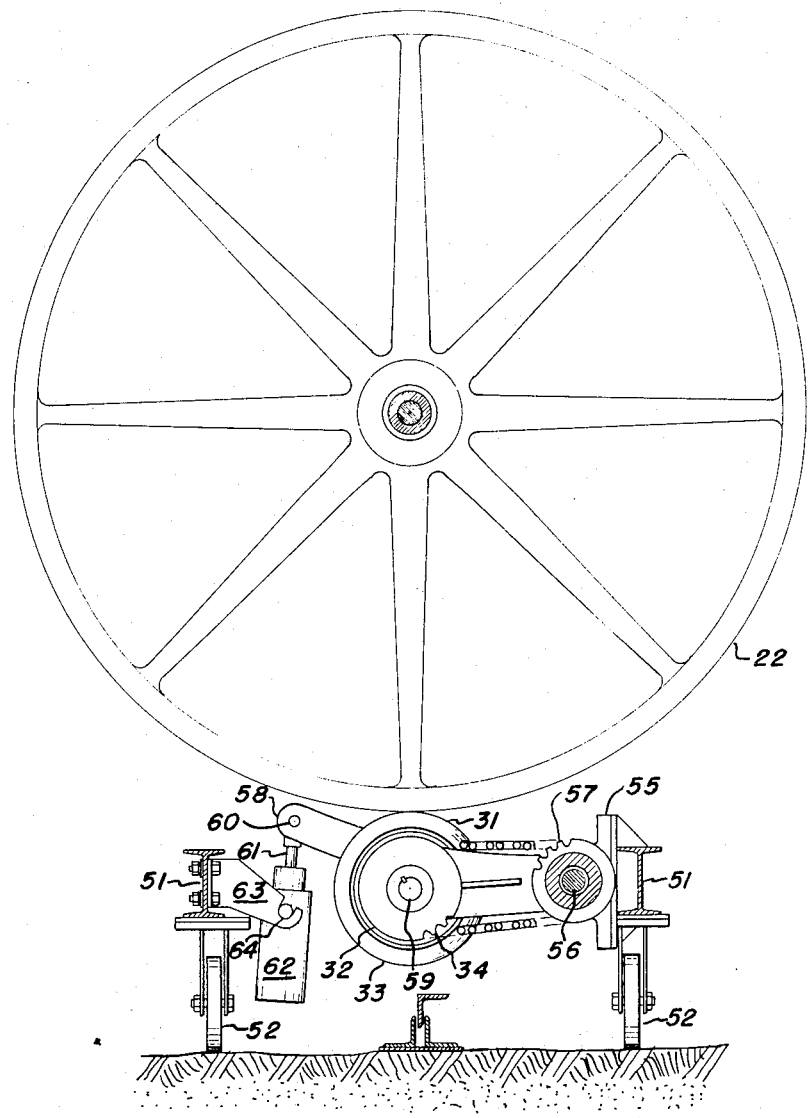

For purposes of full illustration, an embodiment of the apparatus is described with reference to application to the valve and enclosure plate of the Stecher et al. patent above cited inasmuch as this embodiment incorporates many of the refinements of which the invention is susceptible. This embodiment involves correlated operation of two hand wheels mounted on a common axis and one of said wheels being movable, in operation, laterally along its axis. The details of construction and operation of this embodiment are more readily understood from the detailed description given hereafter and from the accompanying figures wherein Figure 1 is a simplified side elevation of an embodiment of the apparatus in operative position, Figure 2 is an end view elevation of the apparatus shown in Figure 1, Figure 3 is a generalized schematic diagram illustrating the inter-relation of the power supply control means and other operative elements of the apparatus, and Figure 4 is a sectional elevation of a portion of the apparatus embodiment shown by Figure 1 and Figure 2, showing in more detail the disposition of certain components of the apparatus.

Referring to Figure 1, the apparatus is shown in operative engagement with the hand wheels 21, 22 forming a portion of a horizontal cylindrical type autoclave installation 11. The discharge of materials from the autoclave is accomplished through a discharge line 12, the interior portion communicating with a horizontal cylindrical port (not shown) in the interior wall of the autoclave. A sealing ring within this cylindrical port makes contacting engagement with a cylindrical plug, this plug being concentric with a shaft 23 and attached thereto, so that rotation of the hand wheel 21 rotates the aforementioned plug. The hand wheel 22, upon rotation, moves the shaft 23, and the associated enclosure plug inwardly or outwardly from the sealing ring as desired. Considerable lateral movement is necessary in order to provide that the closure plug will be backed off sufficiently to provide a clear opening into the discharge line 12.

The apparatus of the invention proper is shown in Figure 1 in operative engagement with the hand wheels 21, 22. The principal portions of the apparatus include drive rollers 31, 41 mounted on a movable carriage frame 51. The carriage frame is supported on wheels 52, the pair furthest from the autoclave customarily being swiveled for easy transport of the apparatus. A moving handle 53 affixed to the frame 51 provides for manual movement from one autoclave to another. Aligning blades 49 permanently affixed in the floor of the building provide for aligning the apparatus with respect to the autoclave by sliding engagement with a matching alignment bar 54 attached to the carriage frame.

Figure 2:
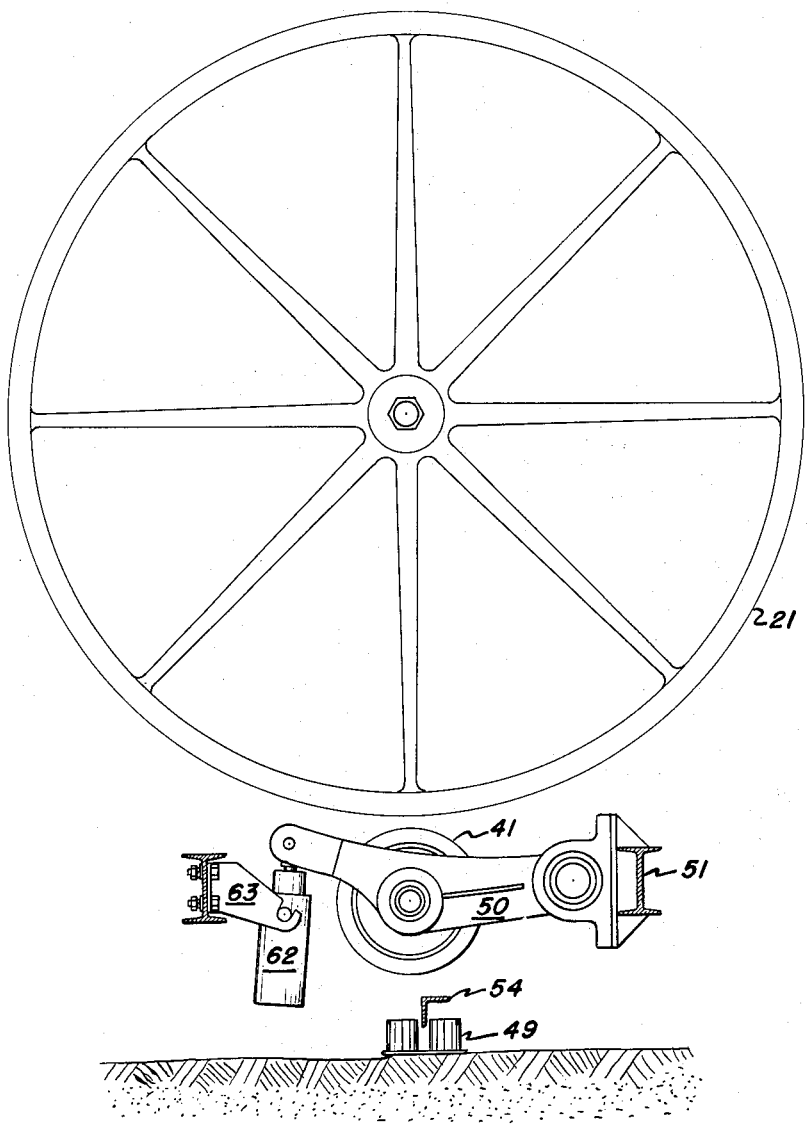

The general disposition of the apparatus with respect to an autoclave is further illustrated by Figure 2, being a section BB elevation corresponding to Figure 1. The operative relationships of the components of the apparatus are more readily explained with reference to Figure 3, this figure being a purely schematic diagram showing the inter-relationship of the hand wheels of the apparatus being actuated, the drive rollers, and the driving means for the drive rollers and the engaging means for the drive rollers. Referring to Figure 3, the components of any embodiment of the invention are illustrated schematically, these including the plurality of hand wheels being actuated, shown herein only as wheel segments 71, 75, drive rollers 72, 76 in operative engagement with the rims of the hand wheels 71, 75, a drive motor 81, and engaging means comprising pneumatically actuated cylinder-piston units 73, 77. The driving wheels or rollers 72, 76 have affixed thereto pulleys or sprockets 74, 78, which are driven by sprocket chains or belts 70, 79, which in turn ride on and are driven by a double sheave drive pulley or sprocket 80. The drive rollers 72, 76 are mounted upon swinging bar frames 68, 69 which pivot about the same center as the powered sprocket 80, and are supported at the opposite ends, through a pivoted connection 66, 67 with the piston rod of the pneumatic cylinder-piston units 73, 77, these actuating means being pivotally supported on trunnions, not shown. It will be seen, for example with reference to drive roller 72, that retraction of the piston of the cylinder piston means 73 will withdraw the roller 72 from operative engagement with the hand wheel segment 71. However, the path of withdrawal of the roller 72 is upon an arc CC, and the relationship of the sprocket or sheave 74, the drive belt or chain 70, and the powered sprocket 80 is not disturbed, and the drive roller 72 continues in operation when the drive sprocket 80 is rotating. A similar relationship is provided with respect to the second drive roller 76 and the rim of the hand wheel segment 75.

The motivating force for the motor 81 is a gas, preferably compressed air. Air supply is obtained through a supply line 91, admission to the apparatus being through a control valve 92, which is set to provide not more than a maximum pressure downstream from the valve in response to pressure signals transmitted by a sensing line 93. Air is supplied to the air motor 81 by a line 94, the air motor being operatively connected to a driving pulley 80 by a crank shaft 82. In some forms of the apparatus this element is a direct shaft drive element. A branch line 96 transmits air to feed lines 97, 98 to the cylinder piston devices 73, 77. A three-way valve 95 is connected to the motor 81 by branch sub-feed lines 101, 102. This provides for on-off control of air supply to the motor 81, and permits reversal of operation, or no operation, of the motor 81 as desired. Air used by the motor is discharged through a vent 103. Separate valves 99, 100 are provided to permit individual on-off control of the cylinder-piston units 73, 77 for independent engagement against the hand wheel segments 71, 75.

The inter-relationship of operation of the apparatus components is best illustrated by describing a typical operation characterized by a period of common and relatively free running motion of the hand wheel rims 71, 75 in the same direction, terminated by a "shock" closure or termination setting of hand wheel rim 71 wherein appreciably more torque must be applied than in the initial free running operation, and in which period the hand wheel 75 is not necessarily rotated. During the free running operation all the valves 95, 99, 100 are open admitting air from the respective lines to the air motor 81 and the cylinder-piston mechanisms 73, 77. Owing to the relatively low torque required for rotation of the hand wheels during this period, the consumption of air by motor 81 is relatively high, this air being discharged to the atmosphere and reducing the effective pressure applied to the cylinders 73, 77. This in turn of course results in a relatively low engaging pressure between the drive rollers 72, 76 against the hand wheel rims 71, 75. At the termination of this cycle, the apparatus encounters positive resistance to further rotation of the hand wheel rims 71, 75 and the flow of air through the air motor is consequently reduced, and this reduction in flow results in an increase in available pressure applied to the air motor 81 because of the reduced amount of venting and in turn results in an increase in pressure applied to the cylinders 73, 77. This then results in a direct increase in engagement pressure of the drive rollers 72, 76 against the hand wheel rims 71, 75. In some instances, this automatic increase in torque applied to the drive rollers and to the engaging pressure against the hand wheel rims will be more than adequate to successfully terminate the desired cycle of operation of the hand wheel. However, the apparatus is further suitable for a further multiplication of torque. This is accomplished as follows. The valve 100 to one of the cylinders is adjusted to release any pressure whatsoever on the cylinder 77 and resulting in retraction of the piston thereof and a disengagement of the drive roller 76 from contact with the hand wheel rim 75. The direction of motion of the motor 81 is reversed and the hand wheel 71 is "backed off" for several turns. It will be apparent that during this operation not only is the engaging pressure between the roller 72 and hand wheel rim 71 at the maximum attainable, but also the torque applied to the drive roller 72 is twice what it was in the immediately preceding cycle owing to the disengagement of the drive roller 76 from operative contact. Thus, any seating tightness which has been developed is readily overcome. The air to the motor 81 is again discontinued and the motor direction again reversed and air pressure again applied for a high torque-high engaging pressure brief cycle of operation until the cycle is completed.

From the foregoing it is seen that the air motor 81 and the cylinder-piston units 73, 77 in conjunction with the air supply line design assures that the apparatus provides automatically an increase in torque available according to the demands of the hand wheels being actuated, but in addition the friction engagement between the drive roller elements and the hand wheels being driven is adjusted automatically in accordance with the requisites of that torque. In other words, owing to the relationship described, when the hand wheels encounter higher resistance to operation, the torque applied is increased concurrently with the engaging pressure so that the product of the coefficient of friction and the engaging pressure are increased to utilize the increased torque generated by the air motor 81 and prevent slippage between the hand wheel and the drive rollers.

When a plurality of rotatable elements are mounted upon a common axis, and axial movement of one relative to the others is involved, the proportions of the drive rollers will be appropriately adjusted. Thus, referring to the embodiment illustrated by Figure 1, the hand wheel 21 moves toward or from the vessel with rotation of the hand wheel 22. The drive roller 41 is of sufficient length to provide for engagement of the hand wheel 21 through its entire path of travel. In embodiments of this character, it is also desirable to provide for a total engaging pressure of the drive roller, against the axially movable element, of less magnitude than provided against the axially non-movable elements. In this manner, lateral slippage of the movable wheel or element is provided whereas no slippage is encountered, axially, between the non-movable element and the drive roller engaging therewith.

It will be readily obvious to those skilled in the art that many other ramifications of the apparatus can be provided without departing from the scope of the invention. Thus, although it would be most customary to actuate hand wheels mounted upon a common axis (for example the autoclave hand wheels 21, 22 illustrated in Figure 1), it will also be seen that the principles of the apparatus are readily adaptable to a plurality of hand wheels mounted upon separate axes as is illustrated in Figure 3. The only requisite for applicability in such instances, of course, is that during a portion of the operative cycle of the apparatus to which the hand wheels appertain is that the respective elements motivated by the hand wheels are necessarily integrated in operation. One example of such a situation would be when separate valves require concurrent and inter-related operation, as for example in a high pressure process system where a by-pass line must be gradually closed in concurrent with the opening of another valve.

In addition to the above variation, it is not absolutely essential that the apparatus be applied to a plurality of hand wheels inasmuch as the striking characteristic or attribute of the apparatus is the inter-relationship of the motion supplying element or motor and the drive roller element which transmits the force by a frictional contact with the hand wheel being actuated. As described in the preceding paragraphs this principle is attained even with only one hand wheel being operated. Nor is it essential that the apparatus be limited to means for applying motion to only two hand wheels. Thus, it is perfectly applicable to apparatus wherein the motion of more than two hand wheels must be attained. In such instances it will also be apparent that a final torque multiplication of the same factor as the number of hand wheels available and actuated can be achieved for any specific hand wheel because of the feature of disengaging the frictional driving rollers at will.

It will also be apparent to those skilled in the art that the relative speeds of rotation of more than one hand wheel being actuated is readily adjustable or provided for by variance in sizes of the drive rollers and the sprockets driven or driving.

As has been noted in conjunction with the description of the embodiment shown in Figure 1 and Figure 2, the invention is peculiarly adaptable to providing as a portable embodiment for operation of a large battery of substantially identical units. The provision of appropriate registration means to guide the apparatus and to appropriate relationship to the hand wheels to be actuated, and the mounting of the apparatus on a portable carriage or a wheeled carriage makes this perfectly feasible. In such instances, flexible connections and quick acting couplings are desirably provided to connect the apparatus at any particular station to an air supply manifold.

For further illustration of the specific embodiment generally shown in Figures 1 and 2, Figure 4 is a cross sectional elevation AA showing additional details of the apparatus of Figure 1. Referring to Figure 4, the apparatus of Figure 1 is shown in operative relationship to the hand wheel 22. The frame 51 or carriage of the apparatus is shown in partial cross section. Caster wheels 52 are rigidly attached to the frame 51 for support of the apparatus and movement from one autoclave unit to another. The drive roller 31 includes a metal center portion 32 and a rim or tread 33 of resilient material such as rubber or thermoplastic resin of any of several types. A conventional pillow block bearing 55 is rigidly attached to one member of the frame 51 and supports an axle 56 upon which is mounted for free rotation thereon a double or triple wheel sprocket 57. Also journaled on the axle 56 is one end of a bearing lever 58. The bearing lever is fitted with a bearing for a second axle 59 which carries thereon the drive roller 31 and a driven sprocket 34 the said sprocket being rigidly affixed to the drive roller 31, and freely rotatable on the axle 59. Several sprocket chains are provided, a drive sprocket chain 35 driving one course of the double course sprocket mounted on axle 56 by a corresponding sprocket driven by an air motor, not shown, and a second sprocket chain 36 transmitting motion from the double sprocket 57 to the drive roller sprocket 34. A terminal extension of the bearing lever 58 is affixed to a piston connecting rod 61 by a pivoted connection 60. The connecting rod 61 is positioned by action of the cylinder-piston assembly 62. A trunnion mounting 63 is rigidly attached to a frame member 51 and provides a seat 64 for tiltable positioning of the cylinder-piston assembly.

Air connections are not shown with respect to Figure 4. It will be readily evident that merely releasing the pressure applied by the cylinder-piston assembly 62 will result in a drop of the bearing arm 58 and a disengagement of the drive roller 31 from operative contact with the hand wheel 22.

It will be quite apparent that the explicit characteristics of any embodiment can be altered by a number of factors. Thus, the degree of friction desired can be altered by varying the characteristics of the flexible rim of the drive roller 31 to provide a higher or a lower coefficient of friction. In addition, the absolute degree of pressure applied can be altered by varying the proportions of the bearing arm 58, the size of the piston-cylinder assembly, and by other factors within the skill of the art. The degree of reduction in engaging pressure by the drive rollers 31, 41 can be affected during operation by appropriate selection of the fluid or air pressure control valve 92. As has been explained heretofore, the motor of any embodiment of the apparatus not only functions in that capacity but also alters the engaging pressure applied by the drive rollers through a supplemental valving action. Thus, the motor is acting in conjunction with the pressure regulating valve 92 to provide a variable demand pressure operative on the drive rollers through the cylinder-piston units. Therefore, a variation in pressure applied to the drive rollers can be effected by either adjustment of the setting of the pressure regulator 92 or by variation of its delivery capacity.

As one specific embodiment of the invention, an air pressure supply of up to 70 pounds per square inch was available as feed to the pressure regulator 92. The pressure regulator was set at a delivery pressure of about 58 pounds per square inch. The air motor 81 was of such a size that it would provide a maximum torque of 30 foot pounds at stallage pressure at 58 pounds per square inch gage. In operation at driven hand wheel speeds of 24 R. P. M., the resultant pressure in the two cylinder-piston units 73, 77 was of the order of 190 pounds as applied at the driving roller wheel rim contact. At stalling speeds, and with only one drive roller in contact with a driven hand wheel, the pressure applied in operative contact was 500 pounds, and the torque supplied by the air motor 30 foot pounds.

Having fully described the apparatus and the preferred embodiments thereof and the method of using the invention, what is desired to be claimed is as follows.

I claim:

1. Apparatus for driving a rotatable round element subject to variable load resistance, including; a driving roller adapted to engage and drive the rotatable element by frictional rolling contact, a gas motor operatively connected to said driving roller, said motor venting gas in proportion to speed of operation, and operable at a speed in inverse proportion to the torque generated, an engaging mechanism operatively connected to said driving roller and adapted to engage said driving roller with the rotatable element, said engaging mechanism being responsive to, and providing engaging pressure in proportion to gas pressure applied to said mechanism, a gas pressure regulator adapted to supply gas at low rates at pre-set pressures, but providing high rates of gas at lower pressure, the pre-set pressure and supply rate corresponding to high torque-low speed operation of said gas motor, a gas manifold conduit connected to said pressure regulator, said gas motor and said engaging mechanism, whereby venting of gas by said motor at low load-high speed conditions induces a reduction in engaging pressure applied by the engaging mechanism.

2. Apparatus for driving dual wheels independently mounted upon a common axis, the wheels being subject to variable load resistance, including; dual driving rollers, each adapted to engage and drive one of the wheels by frictional rolling contact, a gas motor operatively connected to said driving rolls, said motor venting gas in proportion to speed of operation and operable at a speed in inverse proportion to the torque generated, dual engaging mechanisms operatively connected to said driving rollers and adapted to engage said driving rollers with the wheels, said engaging mechanisms being responsive to, and providing engaging pressure in proportion to, gas pressure applied to said mechanism, one of said engaging mechanisms being separately valved to permit disengagement of one driving roller while the other driving roller is engaged, a gas pressure regulator adapted to supply gas at low rates at a pre-set pressure, but providing high rates of gas at lower pressure, the pre-set pressure and supply rate corresponding to high torque-low speed operation of the gas motor, a gas manifold conduit connected to said pressure regulator, said gas motor and said engaging mechanisms, whereby venting of gas by said motor at low load-high speed conditions induces a reduction in engaging pressure applied by the engaging mechanisms.

References Cited in the file of this patent

UNITED STATES PATENTS

| 2,514,857 | Gottbreht | July 11, 1950 |
| 2,626,002 | Wubbe | Jan. 20, 1953 |
| 2,638,172 | Borchin et al. | May 12, 1953 |